US011845483B2

(12) United States Patent
Ellis et al.

(10) Patent No.: US 11,845,483 B2
(45) Date of Patent: Dec. 19, 2023

(54) HYPERLOOP CONTINUOUS CONTROL

(71) Applicants: SAFRAN LANDING SYSTEMS CANADA INC., Ajax (CA); SAFRAN LANDING SYSTEMS, Vélizy-Villacoublay (FR)

(72) Inventors: Andrew Michael Ellis, Guelph (CA); Graeme Peter Arthur Klim, Vélizy-Villacoublay (FR); Thibaud Mazoue, Nogent sur marne (FR)

(73) Assignees: SAFRAN LANDING SYSTEMS CANADA INC., Ajax (CA); SAFRAN LANDING SYSTEMS, Vélizy-Villacoublay (FR)

( * ) Notice: Subject to any disclaimer, the term of this patent is extended or adjusted under 35 U.S.C. 154(b) by 347 days.

(21) Appl. No.: 17/216,064

(22) Filed: Mar. 29, 2021

(65) Prior Publication Data
US 2022/0306168 A1    Sep. 29, 2022

(51) Int. Cl.
  *B61L 3/00*  (2006.01)
  *B61C 11/00* (2006.01)
  *B61K 13/00* (2006.01)
  *B61C 1/00*  (2006.01)

(52) U.S. Cl.
  CPC ............... *B61L 3/006* (2013.01); *B61C 1/00* (2013.01); *B61K 13/00* (2013.01)

(58) Field of Classification Search
  CPC ......... B61B 13/08; B61L 3/006; B61C 11/00; B61K 13/00
  See application file for complete search history.

(56) References Cited

U.S. PATENT DOCUMENTS

| | | | | |
|---|---|---|---|---|
| 5,732,636 | A  * | 3/1998  | Wang  | B60L 13/06 104/284 |
| 6,357,359 | B1 * | 3/2002  | Davey | B60L 13/10 104/282 |
| 10,860,115 | B1  | 12/2020 | Tran  | |
| 11,440,416 | B2 * | 9/2022  | Ellis | B60L 13/06 |
| 2010/0126374 | A1 * | 5/2010 | Ji | B61B 13/08 104/282 |
| 2018/0001999 | A1 * | 1/2018 | Page | B64C 25/14 |

(Continued)

FOREIGN PATENT DOCUMENTS

WO    2020/002019 A1    1/2020

OTHER PUBLICATIONS

International Search Report and Written Opinion dated Jun. 8, 2022, issued in corresponding International Application No. PCT/CA2022/050252, filed Feb. 22, 2022, 8 pages.

(Continued)

*Primary Examiner* — Tarek Elarabi
(74) *Attorney, Agent, or Firm* — CHRISTENSEN O'CONNOR JOHNSON KINDNESS PLLC (57) ABSTRACT

A disclosed controller is configured with logic that, when executed, performs actions to extend landing gear of a maglev vehicle. The actions include receiving a height control target value and transitioning between a standby control state and an active control state. The controller maintains the landing gear in a fixed position when the controller is in the standby control state, and the controller controls extension and retraction of the landing gear according to the height control target value when the controller is in the active control state.

18 Claims, 10 Drawing Sheets

(56) References Cited

U.S. PATENT DOCUMENTS

2018/0141459 A1* 5/2018 Henderson .............. B60L 13/04
2018/0312245 A1  11/2018 Klim et al.
2019/0283239 A1   9/2019 Skaaksrud et al.
2021/0094675 A1*  4/2021 Isaac .................... B64C 25/001
2021/0268913 A1*  9/2021 Ellis ...................... B60L 13/04
2022/0144415 A1*  5/2022 Ellis ...................... B61B 13/08

OTHER PUBLICATIONS

Co-Pending U.S. Appl. No. 17/156,036, filed Jan. 22, 2021, 22 pages.

* cited by examiner

HYPERLOOP CONTINUOUS CONTROL

BACKGROUND

Magnetically levitated ("maglev") transportation systems, such as a Hyperloop vehicle, provide the potential to move passengers and cargo at faster speeds and with improved efficiency compared to currently utilized modes of transportation. These systems employ vehicles that include one or more pressurized capsules to carry passengers and/or cargo through evacuated, i.e., low pressure, tubes. When traveling at high speeds, the vehicles are levitated by magnetic fields, compressed air, or other suitable means. By reducing/eliminating the high-speed air resistance and the friction inherent in the wheels of known vehicles, maglev systems are able to provide greater travel speeds and improved efficiency.

When traveling at low speeds or stopped, the vehicles do not levitate, but are instead supported by a support system that includes a plurality of independently controlled landing gear. Like aircraft landing gear, the maglev support systems reciprocate between an extended (deployed) position and retracted (stowed) position by extending and retracting the individual landing gear. When the vehicles are levitated, the support system is retracted, and the wheels of the landing gear do not contact the ground. When the vehicles are traveling at low speeds or stopped, the support system is extended so that the wheels of the landing gear contact a ground surface to support the vehicles.

Figure 1:
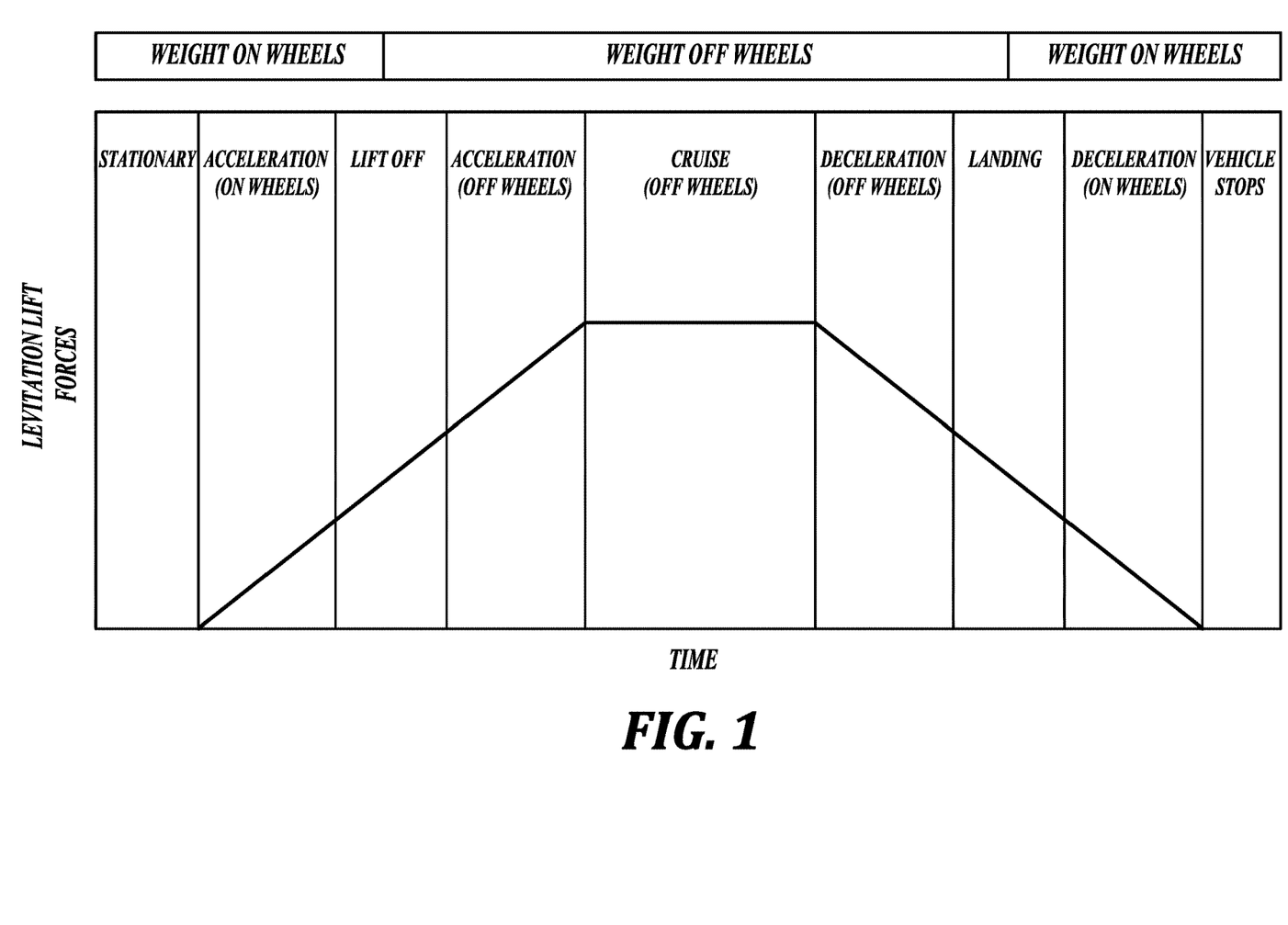
FIG. 1 shows an exemplary mission profile for a known maglev vehicle.

FIG. 1 shows a typical mission profile for a maglev vehicle. The mission profile starts with the vehicle stopped, typically at a station. In some embodiments, the landing gear is extended so that the landing gear wheels are in contact with the ground. In the referenced "Weight on Wheels" (WoW) state, at least a portion of the weight of the vehicle is supported by the landing gear. In some implementations, WoW is defined by the breakout of one or more landing gear shock absorbers such that the condition is TRUE when a small threshold of compression is passed and is otherwise FALSE. In some implementations, WoW is defined as any time one or more tires have contact with the ground, once static stroke has been reached, or any other set of conditions when at least one wheel is in contact with the ground. In some implementations, other conditions may be considered to determine WoW. For example, in some implementations, any time the tires or other ground engaging member of the landing gear are in contact with the ground (also known as "touchdown") may be considered a condition in which WoW is TRUE. In some implementations, the WoW may be considered to be TRUE once static stroke has been reached.

In some implementations, when the vehicle is docked at a station, the vehicle is temporarily secured to the dock so that the dock at least partially supports the vehicle weight. With the vehicle at least partially supported in this manner, the vehicle height is stabilized as the passengers and cargo move onto and off of the vehicle. For such implementations, the vehicle disengages from the dock to a WoW condition before departing the station.

Still referring to FIG. 1, the vehicle, which still supported by the landing gear, accelerates from the stationary position. As the vehicle accelerates in the WoW condition, the levitation lift forces that support the vehicle during high-speed travel increase. As the levitation lift forces continue to increase, the landing gear begins to retract until liftoff occurs, after which the landing gear wheels are no longer in contact with the ground, i.e., WoW is FALSE. With the vehicle now fully supported by the levitation lift forces, the landing gear continues to retract until the landing gear reaches a stowed position. At the same time, the vehicle continues to accelerate until cruise speed is reached.

With the vehicle traveling at cruise speed, the gear is stowed, and the levitation lift forces are generally maintained at constant level. These cruise conditions are maintained until the vehicle approaches a station, at which time the vehicle begins to decelerate.

As the vehicle decelerates, the landing gear begins to extend from the stowed position, and the levitation lift forces begin to decrease. The levitation lift forces continue to decrease, and the landing gear continues to extend until the vehicle touches down, i.e., reaches a WoW state. Landing gear extension continues until the landing gear reaches a predetermined extended state, and the levitation lift forces continue to decrease until the vehicle is fully supported by the landing gear. In some embodiments, the landing gear continues to extend and retract to actively control the vehicle height.

With the vehicle fully supported by the wheels, the vehicle continues to decelerate until the vehicle reaches the station. At the station, the vehicle comes to a complete stop. In some embodiments, the vehicle is temporarily secured to the dock so that the dock at least partially supports the vehicle weight while passengers and cargo move on to and off of the vehicle.

In some implementations, landing gear are grouped on two or more independent bogies (like a train). Each landing gear includes a wheel assembly that is extendable and retractable by an actuator. The actuator, which may be hydraulic, electric, pneumatic, etc., is configured to control the position of the wheel assembly so that the landing gear control the height of the vehicle relative to the ground interface (track) when the vehicle is supported by the support system.

Figure 2:
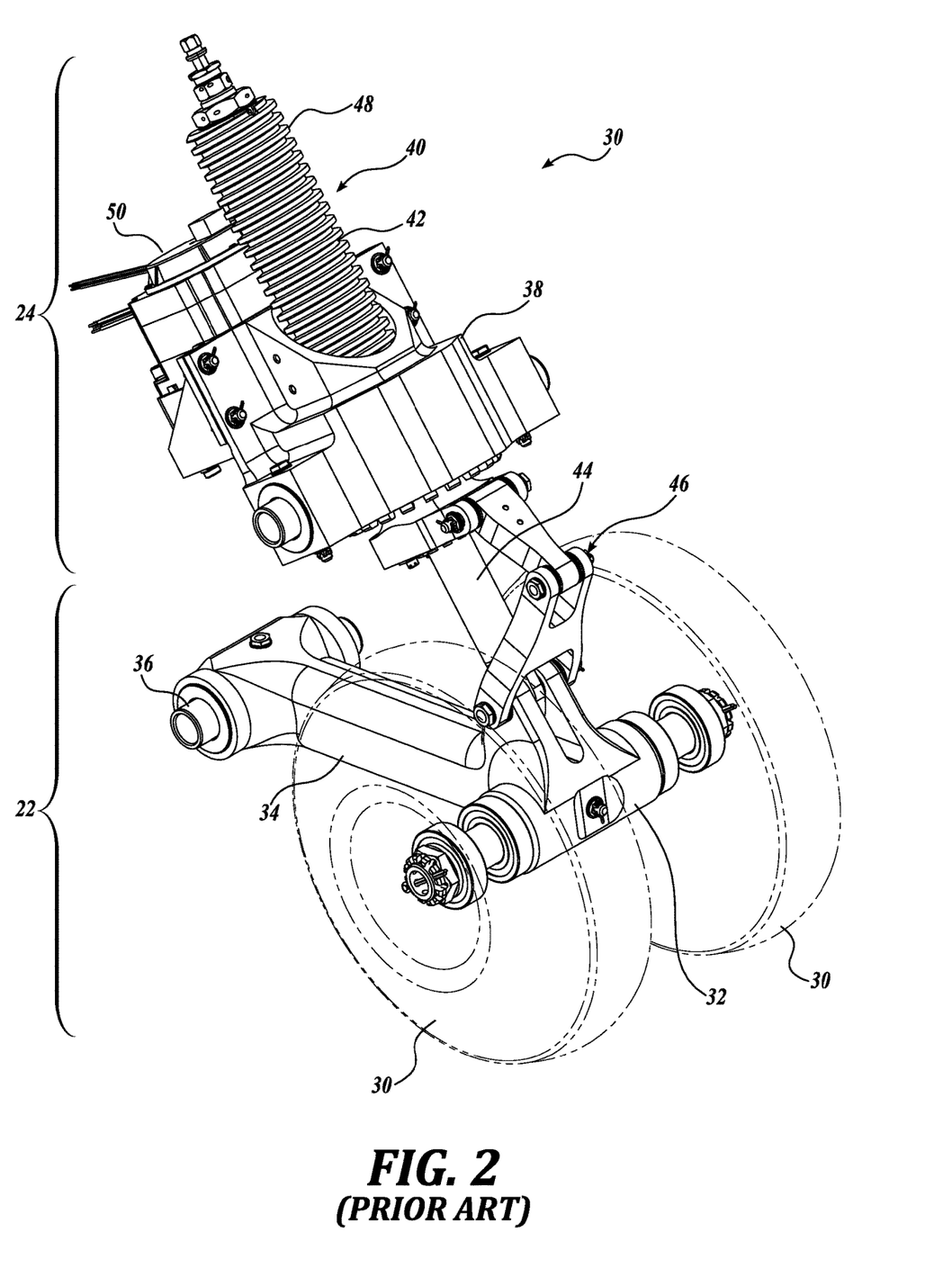
FIG. 2 shows an isometric view of a known arrangement of a deployable and retractable landing gear suitable for use as part of a support system for a maglev vehicle.

FIG. 2 shows an arrangement of a known extendable and retractable landing gear 20 suitable for use as part of a wheeled support system for a maglev vehicle. The landing gear 20 is disclosed in U.S. Patent Application Publication 2018/0312245 ("Klim et al."), filed Apr. 26, 2017, and currently assigned to Safran Landing Systems Canada Inc., the disclosure of which is expressly incorporated by reference herein. The landing gear 20 includes a wheel assembly 22 that is selectively reciprocated between an extended position and a retracted position by an actuator 24.

As shown in FIG. 2, the wheel assembly 22 includes a pair of wheels 30 rotatably mounted to an axle 32 that is positioned at one end of a trailing arm body 34. A pivot pin 36 is positioned at the other end of the trailing arm body 34 and rotatably couples the trailing arm body to the vehicle.

The actuator 24 comprises a housing 38 pivotably mounted to a vehicle (not shown), such as an aircraft or a maglev vehicle. A shock absorber 40 extends through an aperture in the housing 38 and includes a cylinder 42 and a piston 44 slidingly engaged with the cylinder. The piston 44 is pivotably connected to the trailing arm body 34 of the wheel assembly 22. A torsion link assembly 46 maintains the rotational position of the trailing arm body 34 relative to the housing 38 about the longitudinal axis of the piston 44.

The cylinder 42 includes an external screw thread 48 that engages an internal screw thread formed in the aperture of the housing 38. A motor 50 is fixed to the housing 38 and selectively rotates the cylinder 42. Rotation of the cylinder 42 moves the piston 44 in an axial direction. The axial movement of the piston 44 rotates the wheel assembly 22 about its pivotal connection to the vehicle, thereby extending and retracting the landing gear 20.

Figure 3:
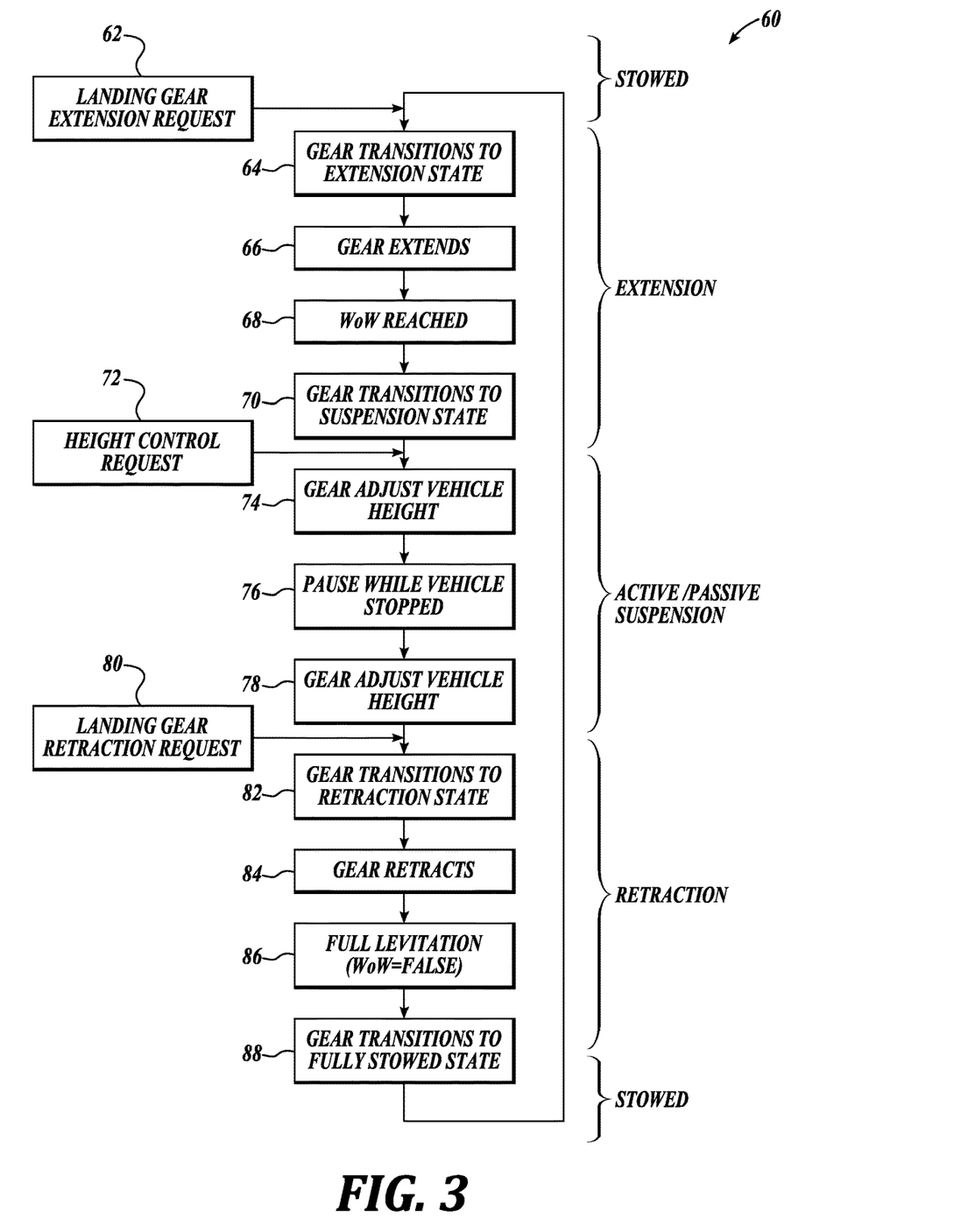
FIG. 3 shows a known method for controlling the landing gear of a maglev vehicle.

FIG. 3 shows a typical method 60 for controlling the landing gear of a maglev vehicle. As will be described in further detail, the method 60 defines several discrete operational states and controls the landing gear according to the current state. More specifically, at any particular time, the method 60 characterizes the landing gear as being in a stowed state, an extension state, an active/passive suspension state, or a retraction state and controls the landing gear according to parameters of the current state.

The method 60 begins with the landing gear in a stowed state, i.e., the landing gear is retracted, and the vehicle is fully supported by the levitation lift forces. The method 60 continues with the landing gear in the stowed state until, in block 62, a landing gear extension request is sent.

The method 60 proceeds to block 64, wherein the landing gear transitions to an extension state in response to the landing gear extension request. In block 66, the landing gear begins to extend. As the landing gear extends, the wheels contact the ground in block 68 so that WoW is reached. After WoW has been reached, in block 70, the landing gear transitions to a suspension state. That is, the landing gear continues to extend, and the levitation lift forces are decreased until the weight of the vehicle is fully supported by the landing gear.

With the landing gear in a suspension state, a height control request is made in block 72. In block 74, the landing gear extends and retracts to maintain the vehicle at the requested height until the vehicle stops in block 76, which typically occurs at a station. While the vehicle is stopped, active/passive suspension is paused, and the vehicle is typically secured to fixed docking structure within the station.

To depart the station, the vehicle disengages with the fixed docking structure and is again actively supported by the landing gear in block 78. In block 78, the landing gear extends and retracts to maintain the desired vehicle height.

As the vehicle accelerates, a landing gear retraction request is made in block 80. In block 82, the landing gear transitions to the retraction state in response to the landing gear retraction request, and in block 84, the landing gear starts to retract. Retraction of the landing gear continues until, in block 86, the landing gear disengages from the ground, and the vehicle is fully supported by the levitation lift forces, i.e., WoW=FALSE.

The landing gear continues to retract until the landing gear is in a fully stowed state in block 88. The method 60 maintains the landing gear in the fully stowed state until a landing gear extension request is received in block 62.

The described method 60 and other known architecture manage landing gear operation via discrete state logic. That is, the landing gear system includes a variety states or modes that are transitioned between based on external indication and used to satisfy a variety of specific functions.

As will be described in further detail, embodiments of the presently disclosed system utilize larger modes of operation that are capable of responding to a variety of criteria and performing a larger variety of functions based on continuous feedback without changing the state of the system.

SUMMARY

As will be described in further detail below, embodiments of the presently disclosed system utilize larger modes of operation that are capable of responding to a variety of criteria and performing a larger variety of functions based on continuous feedback without changing the state of the system.

The subject matter disclosed herein provides examples of a controller performing actions to control extension and retraction of the support system of a maglev vehicle. The support system includes a plurality of landing gear, and the method utilizes closed-loop control to continuously determine a vehicle height error. The controller controls extension and retraction of the landing gear to minimize the vehicle height error.

A disclosed embodiment of a controller is configured with logic that, when executed, performs actions to extend landing gear of a maglev vehicle. The actions include receiving a height control target value and transitioning between a standby control state and an active control state. The controller maintains the landing gear in a fixed position when the controller is in the standby control state, and the controller controls extension and retraction of the landing gear according to the height control target value when the controller is in the active control state.

In any embodiment, a first height control target value corresponds to a stowed position, and a second height control target value corresponds to a deployed position.

In any embodiment, the controller extends and retracts the landing gear to maintain a target vehicle height when the landing gear is in the deployed position.

In any embodiment, the controller in the active control state performs the action of receiving a first height control target value corresponding to a landing gear extension state. The controller in the active control state further performs the actions of sensing a vehicle height and calculating an error, wherein the error corresponds to a difference between the vehicle height and the first height control target value. The controller extends and/or retracts the landing gear to reduce the error.

In any embodiment, the controller in the active control state performs the action of receiving a second height control target value corresponding to a second landing gear extension state. The controller in the active control state further performs the actions of calculating the error and at least one of extending and contracting the landing gear to reduce the error.

In any embodiment, the controller in the active control state performs actions further comprising the step of stopping the at least one of extending and contracting the landing gear when the error is less than a predetermined value.

In any embodiment, a height control target value to stow the landing gear is less than a minimum vehicle levitation height.

In any embodiment, the minimal vehicle levitation height, corresponds to a minimum vehicle height when Weight on Wheels is FALSE.

In any embodiment, the controller in the active state calculates the error and controls extension and retraction of the landing gear.

In any embodiment, the controller in the active state uses closed-loop feedback to calculate the error.

In any embodiment, the controller comprises a proportional-integral-derivative controller.

In any embodiment, the controller comprises an integrator.

In any embodiment, the controller in the active state resets the integrator when the landing gear reaches a fully stowed position.

In any embodiment, the controller in the active state resets the integrator when the landing gear moves from a fully stowed position.

In any embodiment, the controller in the active state disables the integrator when Weight on Wheels is TRUE.

In an embodiment, a provided maglev vehicle includes a landing gear selectively moveable between an extended position and a retracted position. The maglev vehicle further includes a sensor configured to sense a vehicle height and a controller in operable communication with the landing gear and the sensor. The controller includes one or more circuits programmed to receive a command corresponding to a height control target value and to transition between a standby control state and an active control state. The controller maintains the landing gear in a fixed position when the controller is in the standby control state. The controller in the active control state controls extension and retraction of the landing gear to reduce a difference between the sensed vehicle height and the height control target value.

In any embodiment, the controller is a proportional-integral-derivative controller.

In any embodiment, the controller includes one or more circuits programmed to extend and deploy the landing gear using closed-loop control.

In any embodiment, the controller includes one or more circuits configured to receive different height control target values, each height control target value corresponding to an operating condition of the maglev vehicle.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this disclosed subject matter will become more readily appreciated as the same become better understood by reference to the following detailed description, when taken in conjunction with the accompanying drawings, wherein.

DETAILED DESCRIPTION

A maglev vehicle with a retractable landing gear system is provided. The support system includes a plurality of independently actuated landing gear. In order to provide coordinated extension of the landing gear, a control unit or a controller, such as a control circuit, is provided that supervises and actively controls extension of the landing gear in order to control the positions of the landing gear throughout the extension of the support system.

Figure 4:
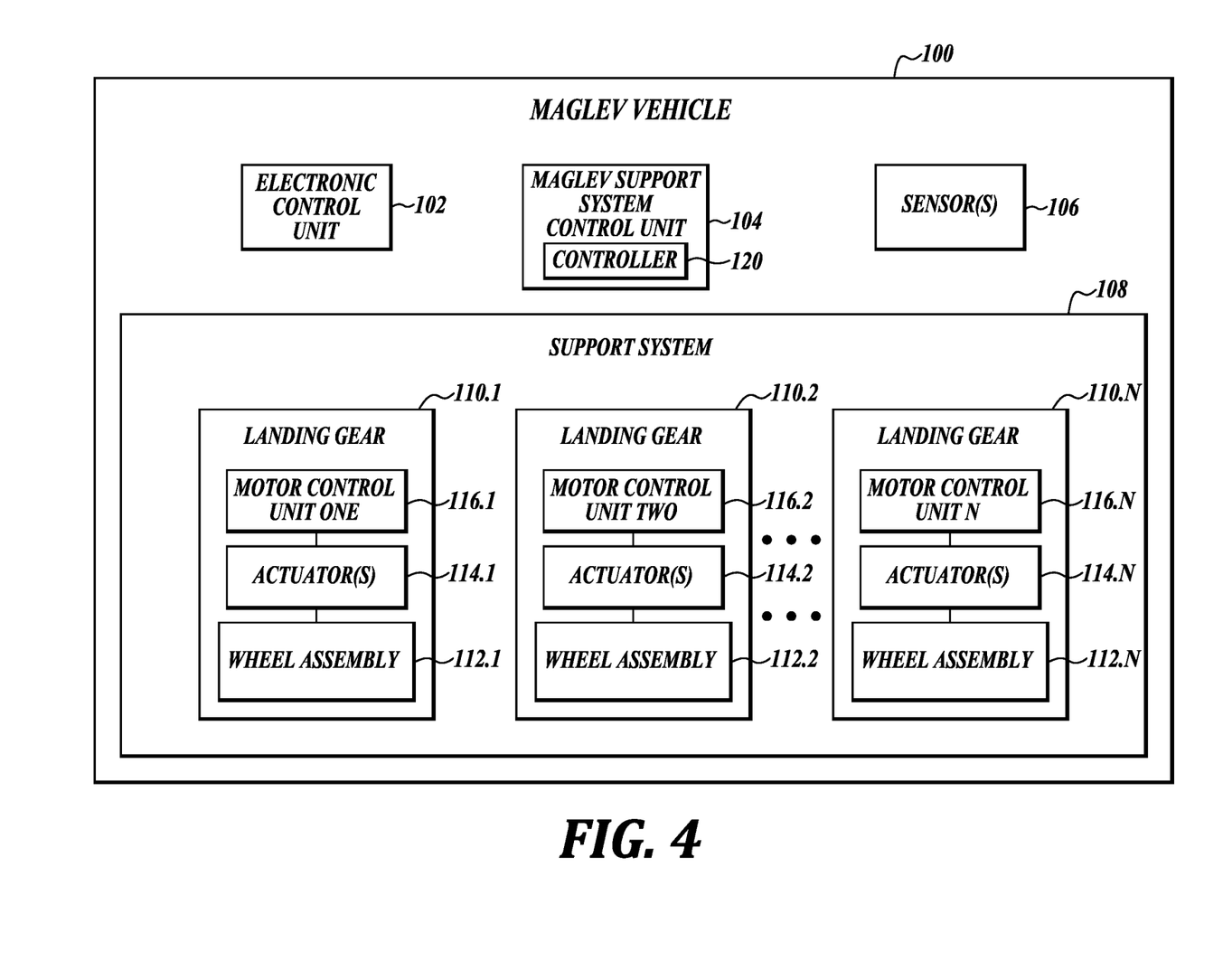
FIG. 4 shows a schematic view of a representative embodiment of a maglev vehicle with a number of landing gear suitable for use with disclosed control methods.

FIG. 4 shows a schematic view of a representative embodiment of a maglev vehicle 100 with a number (N) of landing gear suitable for use with disclosed control methods. As illustrated, the maglev vehicle 100 includes a central electronic control unit (ECU) 102 that is responsible for overall control of the operation of the maglev vehicle 100. The ECU 102 is communicatively coupled to a maglev support system control unit (MSSCU) 104 that is responsible for coordinating the state of all components of the support system 108. In the illustrated embodiment, the MSSCU 104 includes a controller 120 having one or more circuits programmed to perform the methods described herein.

The support system 108 includes a plurality of landing gear, including illustrated landing gear 110.1, 110.2, and 110.N. To that end, the MSSCU 104 is communicatively coupled to one or more motor control units (MCUs), including the illustrated MCUs 116.1, 116.2, and 116.N, and may transmit control inputs to the MCUs. Each MCU controls one or more actuators, such as actuators 114.1, 114.2, and 114.N, which drive extension, retraction, and active vehicle height control for corresponding wheel assemblies 112.1, 112.2, and 122.N, respectively.

The illustrated controller 120 is shown as being a part of the MSSCU 104. In some embodiments, the controller 120 is a discrete controller. In some embodiments, the controller 120 is integral to the MSSCU 104. In some embodiments, the described functions of the controller 120 are performed by one or more other control units, such as the ECU and/or the MCUs. In some embodiments, the controller 120 is a proportional-integral-derivative (PID) controller. In some embodiments, the controller 120 is any control loop mechanism configured to utilize feedback to continuously calculate an error value.

In some embodiments, the various control units include a processor and memory. The memory may include computer readable storage media in read-only memory (ROM), random-access memory (RAM), and keep-alive memory (KAM), for example. The KAM may be used to store various operating variables or program instructions while the processor is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, instructions, programs, modules, etc.

As used herein, the term processor is not limited to integrated circuits referred to in the art as a computer, but broadly refers to a microcontroller, a microcomputer, a microprocessor, a programmable logic controller, an application specific integrated circuit, other programmable circuits, combinations of the above, among others. Therefore, as used herein, the term "processor" can be used to generally describe these aforementioned components, and can be either hardware or software, or combinations thereof, that implement logic for carrying out various aspects of the present disclosure. Similarly, the terms "module" and "unit" can include logic that may be implemented in either hardware or software, or combinations thereof.

As illustrated, the maglev vehicle 100 also includes one or more sensor(s) 106. These sensor(s) 106 may include landing gear state sensors capable of generating values that represent states including, but not limited to, whether the landing gear is in contact with the ground, whether the landing gear has reached static stroke, an amount of compression of a shock absorber of the landing gear, and the distance from a landing gear component to a support surface (vehicle height H). These sensor(s) 106 may also include vehicle state sensors capable of generating values that represent states including, but not limited to, a vehicle speed and a distance between a component of the maglev vehicle 100 and a levitation mechanism. Any suitable types of devices may be used to act as sensor(s) 106, including but not limited to shaft encoders, photosensors, sonic rangefinders, and laser measurement devices. In some embodiments, the sensor(s) 106 are communicatively coupled to the ECU 102 and/or the MSSCU 104, and values generated by the sensor(s) 106 may be transmitted to the ECU 102 and/or the MSSCU 104.

In some embodiments, additional copies of ECU 102, MSSCU 104, and/or other components may be provided for redundancy. Further, the components of maglev vehicle 100 may be communicatively coupled via any suitable communication technique, including but not limited to serial wired communication, wireless communication (via Bluetooth, Wi-Fi, or other wireless communication techniques), and/or networked wired communication (via USB, Ethernet, CAN-BUS, or other wired communication techniques). Also, the separation of functionality between the ECU 102 and MSSCU 104 is an example only, and in some embodiments, functionality of the ECU 102 and MSSCU 104 may be combined in a single device.

One of skill in the art will recognize that embodiments of the maglev vehicle 100 may also include other components, including but not limited to magnets and/or other components of a levitation system, and a passenger/cargo cabin. Such components have not been illustrated in FIG. 4 to avoid obscuring other aspects of the present disclosure. Further, three of the N landing gear that form the support system 108 are shown in FIG. 4 with the understanding that the remaining (N−3) landing gear or assemblies are similarly configured. In addition, one of skill in the art will recognize that the alternate embodiments of the support system 108 may include different numbers N of landing gear (and associated components), and such variations should be considered within the scope of the present disclosure.

Figure 5:
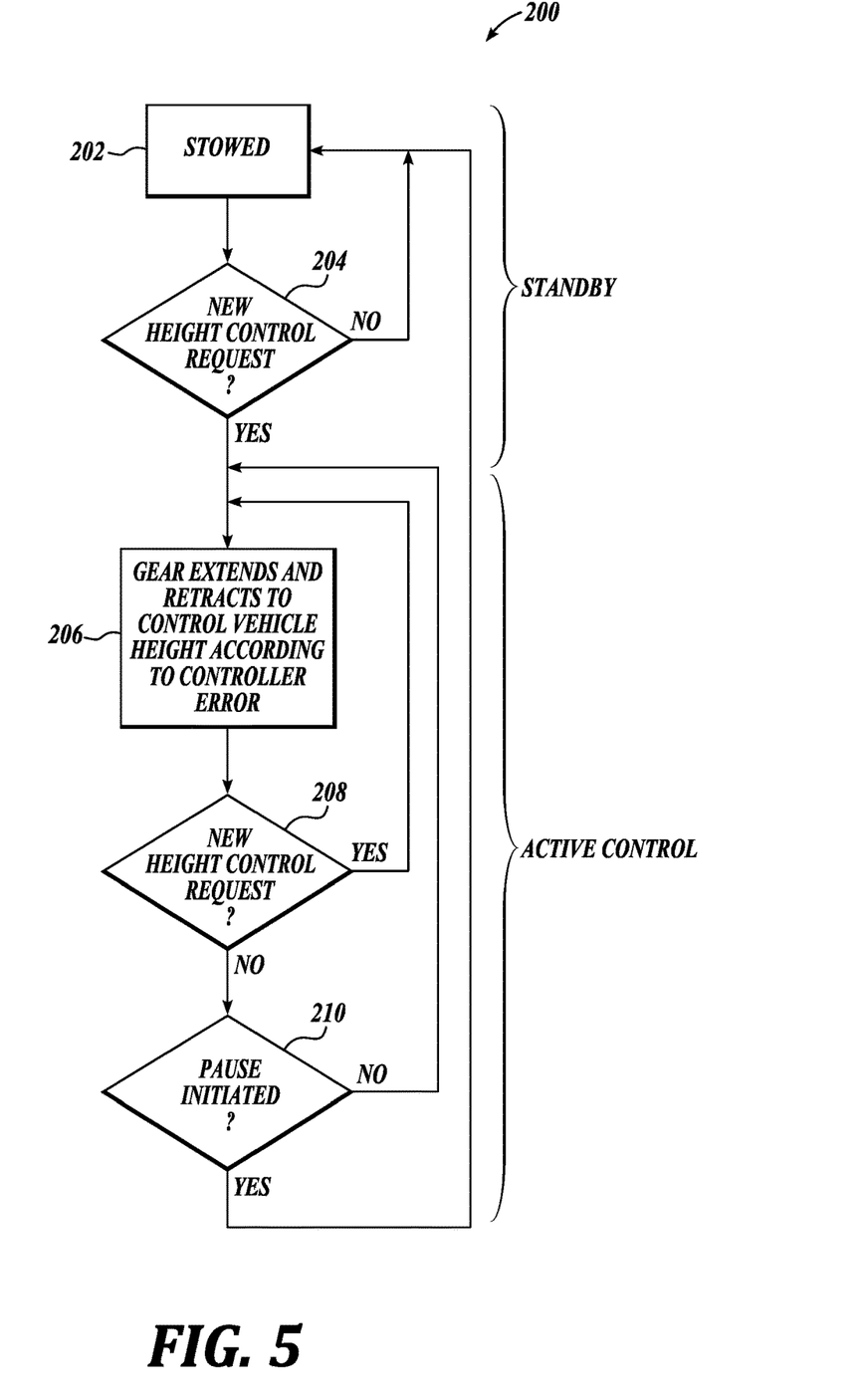
FIG. 5 shows a representative embodiment of a high-level method of controlling the landing gear of a maglev vehicle.

FIG. 5 shows a representative embodiment of a high-level method 200 of controlling the landing gear of a maglev vehicle 100 according to the present disclosure. In an embodiment, the ECU 102, MSSCU 104, and the MCUs 116.1, 116.2, and 116.N, alone or in combination with other suitable processors and/or controllers (e.g., one or more processing or control circuits, etc.), are programmed to carry out steps of the method 200. In an embodiment, the ECU, the MSSCU, and/or the MCU are programmed to carry out one or more steps of the methods of claims 1-15.

Compared to known control methods, embodiments of currently disclosed methods provide simplified control by defining two landing gear states: "standby" and "active control." As will be described in further detail, when the landing gear is in the standby state, the landing gear control is stowed, and the system is awaiting control signals. When the landing gear is in the active control state, the landing gear is controlled according to vehicle height command signals that correspond the vehicle height for various portions of the maglev vehicle travel cycle. To move the landing gear between the stowed and active states and between different operational positions, a height command corresponding to the vehicle height for the desired state, i.e. a target height, is given, and the landing gear is controlled to minimize the difference between the target height and the actual vehicle height.

The method 200 starts at block 202 with the landing gear stowed and the vehicle in a standby state. In the standby state, the landing gear is stowed, and the vehicle is fully supported by the levitation lift forces, such as when the vehicle is operating under normal cruise conditions.

In block 204, the method 200 determines if a new height control request has been received. If a new height control request has not been received, the method 200 returns to block 202, and the vehicle remains in the standby state with the landing gear stowed until a new height control request is received. When a new height control request has been received, the method 200 proceeds to block 206, and the vehicle enters an active control state.

In block 206, the method 200 controls the extension/retraction of the landing gear according to a controller error determined by comparing the height requested by the height control request to the actual height of the vehicle. More specifically, one or more of the previously described controllers, alone or in combination, determines a controller error and moves the landing gear to minimize the error, i.e., the controller extends or retracts the landing gear such that the actual height of the vehicle approaches the requested height.

In block 208, the method 200 determines if a new height control request has been received. If a new height control request has been receive, the method returns to block 206, and the method controls the extension/retraction of the landing gear according to a controller error determined by comparing the new requested height to the actual height of the vehicle. If a new height control request has not been received in block 208, then the method 200 proceeds to block 210.

In block 210, the method 200 determines if a pause has been initiated. That is, the method 200 determines if the landing gear has reached a stowed position and active control of the landing gear is to be paused. If a pause has been initiated, the method 200 proceeds back to block 202, and the vehicle returns to a standby state with the landing gear stowed. If a pause has not been initiated in block 210, then the method 200 returns to block 206, and active control of the landing gear continues.

The described method 200 provides simplified control of the landing gear as compared to known methods because the method 200 does not utilize difference discrete states for landing gear extension, retraction, and active suspension. Instead, the method 200 uses a closed-loop control system, i.e., a feedback control system, to control all movement of the landing gear using continuous state logic when the landing gear is subject to active control.

Figure 6:
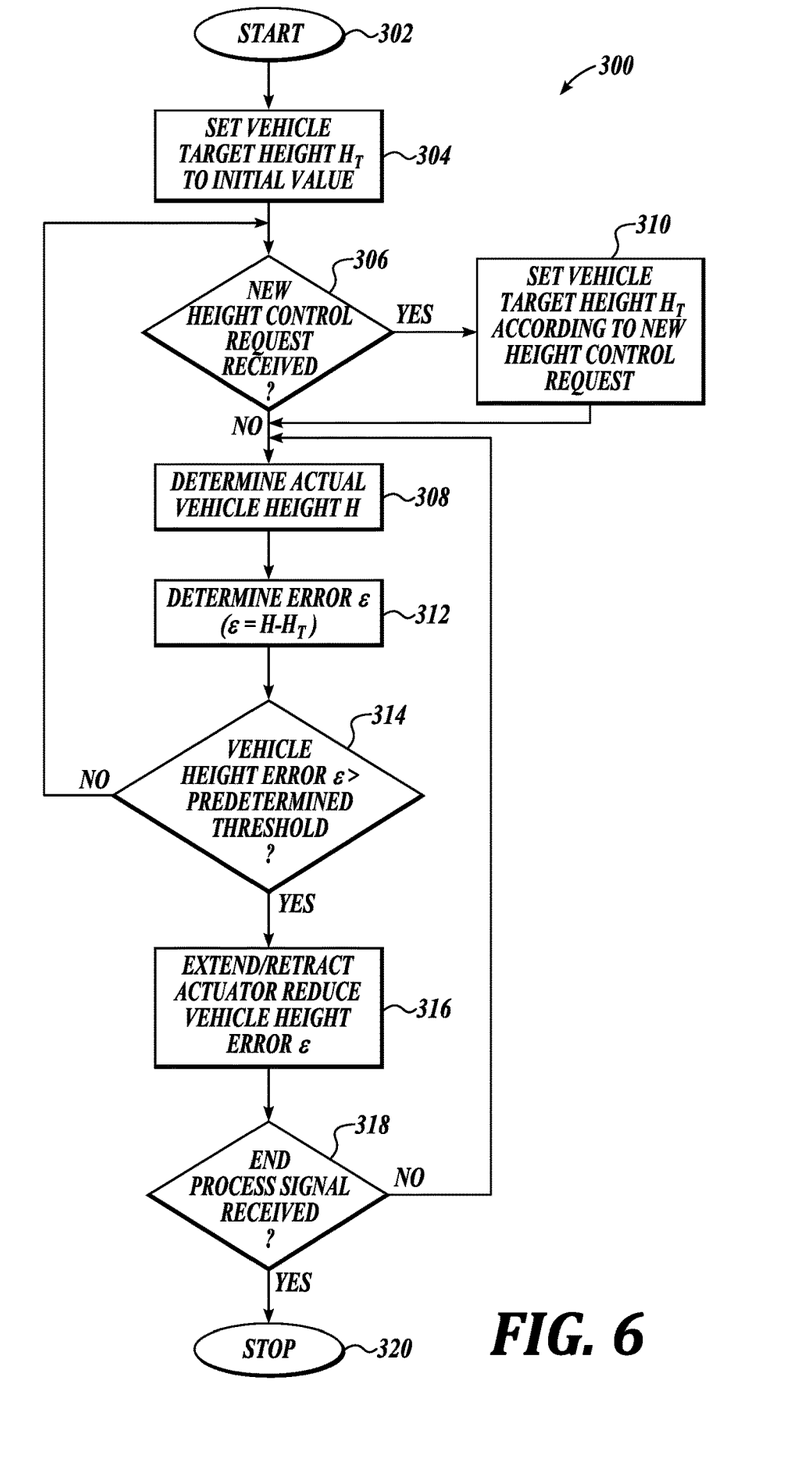
FIG. 6 shows first representative embodiment of the method shown in FIG. 5.

FIG. 6 shows an embodiment of the method 200 shown in FIG. 5, wherein the illustrated method 300 utilizes a controller to provide the feedback control of the landing gear position. In some embodiments, the controller is a PID controller. In some embodiments, the controller is any control loop mechanism having one or more circuits configured to utilize feedback to continuously calculate an error value.

The method 300 starts at block 302 and proceeds to block 304. In block 304, the vehicle target height $H_T$ is set to an initial value, wherein the vehicle target height is the height of the vehicle at a desired operating state. In some embodiments, the initial vehicle target height is the last previously received vehicle target height $H_T$. In some embodiments, the vehicle target height $H_T$ is a predetermined target height or a default vehicle target height. The method 300 then proceeds to block 306.

In block 306, the method 300 determines if a new height control request has been received. A new height control request indicates a new vehicle target height $H_T$ that corresponds to a desired operating state. If a new height control request has not been received, then the vehicle target height $H_T$ remains unchanged, and the method 300 proceeds to block 308. If a new height control has been received, then the method 300 proceeds to block 310. In block 310, the vehicle target height $H_T$ is set to the target height corresponding to the height control request. The method 300 then proceeds to block 308.

In block 308, the actual height H of the vehicle is determined by one or more sensors 106. In some embodiments, the vehicle height H is measured directly. In some embodiments, the vehicle height is determined indirectly from one or more sensed vehicle conditions. The method 300 then proceeds to block 312.

In block 312, a vehicle height error ε is determined. In some embodiments, the vehicle height error is defined as the difference between the actual vehicle height H and the target height $H_T$ such that:

$$\varepsilon = H - H_T$$

The method proceeds to block 314, in which method 300 determines if the vehicle height error ε is greater than a predetermined threshold. If the vehicle height error ε is less than the predetermined threshold, then the method 300 returns to block 306 to determine if a new height control request has been received. If the vehicle height error ε is greater than the predetermined threshold, then the method 300 proceeds to block 316. In some embodiments, the predetermined threshold is 0. That is, the method 300 proceeds to block 316 for any non-zero value of vehicle height error ε. In some embodiments, the predetermined threshold is a non-zero value to reduce the number of minor extensions and retractions in block 316.

In block 316, the landing gear is extended or retracted according to the vehicle height error ε. More specifically, the landing gear is extended or retracted to reduce the vehicle height error ε. If the vehicle height error ε indicates that the vehicle height H is greater than the vehicle target height $H_T$, then the landing gear is retracted to lower the vehicle height. If the vehicle height error ε indicates that the vehicle height H is less than the vehicle target height $H_T$, then the landing gear is extended to increase the vehicle height.

In block 318, the method 300 checks for an end process signal. In some embodiments, the end process signal is given to put the landing gear into standby mode, such as when the landing gear is stowed, and the vehicle is traveling under cruise conditions. In some embodiments, the standby mode is enabled when the vehicle is docked and/or at least partially supported by a fixed support structure. If an end process signal is detected, the method 300 proceeds to block 320, and the method 300 ends as the landing gear enters standby mode. If an end process signal is not received, the method 300 returns to block 308, and active control of the landing gear continues.

Figure 7:
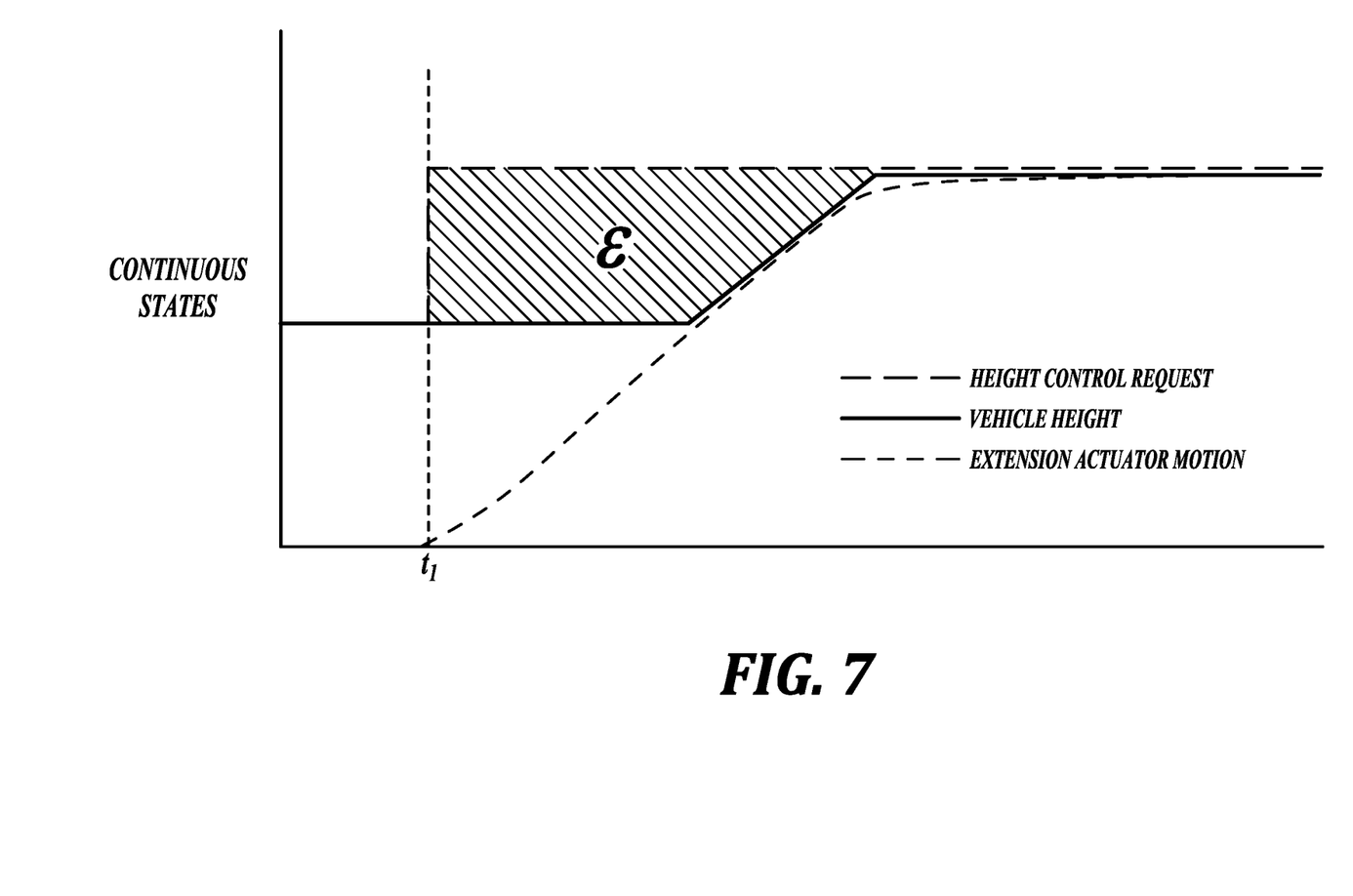
FIG. 7 shows a graphical representation of a landing gear extension according to the method of FIG. 6.
Figure 8:
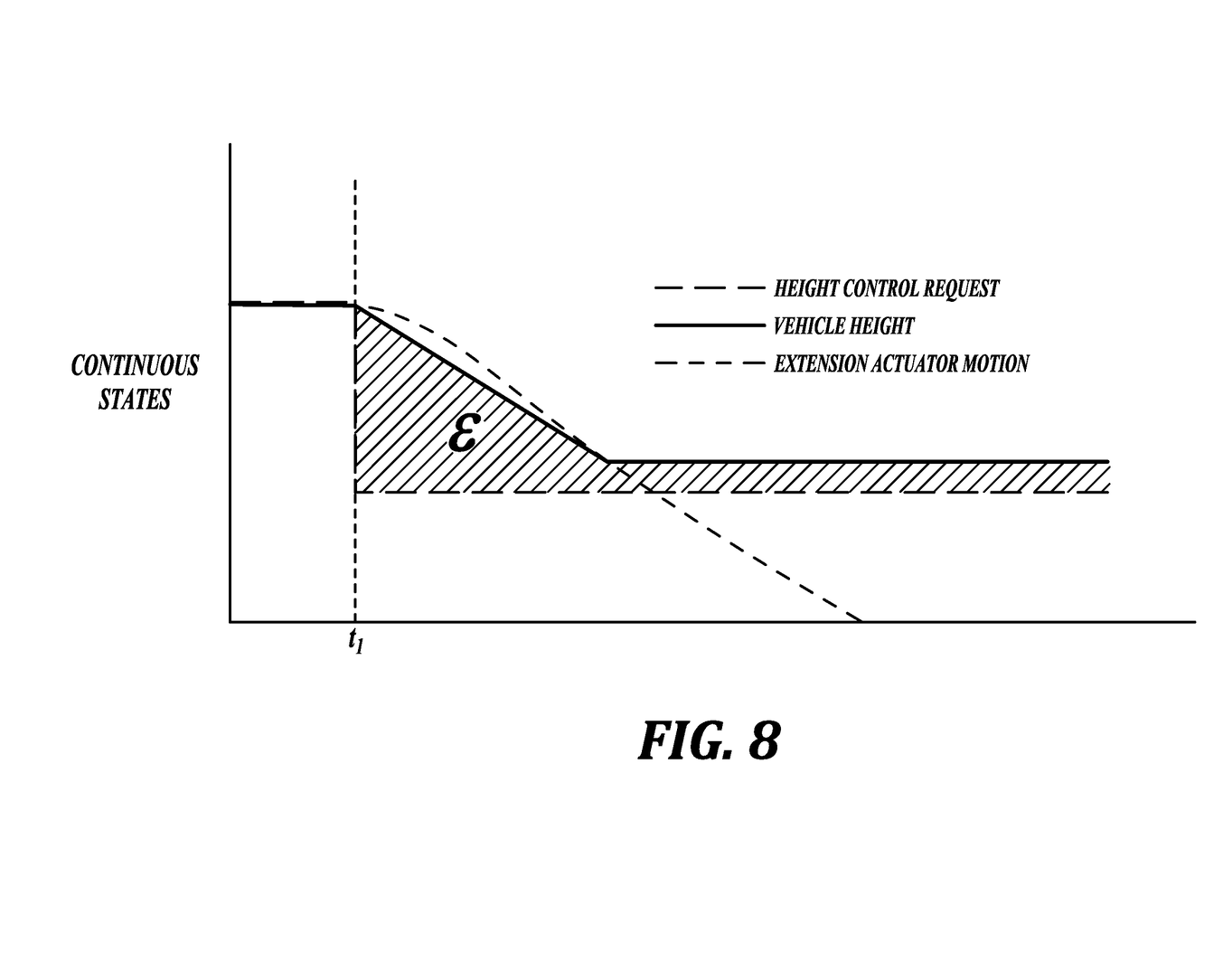
FIG. 8 shows a graphical representation of a landing gear retraction according to the method of FIG. 6.

FIGS. 7 and 8 show a graphical representation of the continuous state logic control for landing gear extension and retraction, respectively, according to the method 300 of FIG. 6. Referring to FIG. 7, the graph starts with the vehicle at a constant height that is equal to the vehicle target height, e.g., the height of the previous height control request. At time $t_1$, a new height control request is received to increase the vehicle target height. With the target height now greater than the actual vehicle height, a vehicle height error ε is determined, wherein the vehicle height error at any given time is represented by the distance between the vehicle target height and the vehicle height. In response to the vehicle height error ε, the actuators begin to extend the landing gear to minimize the vehicle height error ε. The landing gear extension continues until the vehicle height error ε is less than a predetermined threshold. That is, the landing gear extension continues until the actual vehicle height is sufficiently close to the vehicle target height.

Referring now to FIG. 8, the graph starts with the vehicle at a constant height that is approximately equal to the vehicle target height, i.e., the height of the previous height control request. At time $t_1$, a new height control request is received that decreases the vehicle target height. With the target height now less than the actual vehicle height, a vehicle height error ε is determined, wherein the vehicle height error at any given time is represented by the distance between the vehicle target height and the vehicle height. In response to the vehicle height error ε, the actuators begin to retract the landing gear to minimize the vehicle height error ε. The landing gear retraction continues until the vehicle height error ε is below a predetermined threshold.

In the illustrated embodiment, the height control request sets the target height at a value less than the minimum possible levitation height. When the vehicle reaches the minimum possible levitation height, lift-off occurs, i.e., the landing gear disengages with the ground/track. Because the vehicle height is still greater than the target height, the vehicle height error ε persists, and retraction of the landing gear continues until the landing gear reaches the stowed position.

Figure 9:
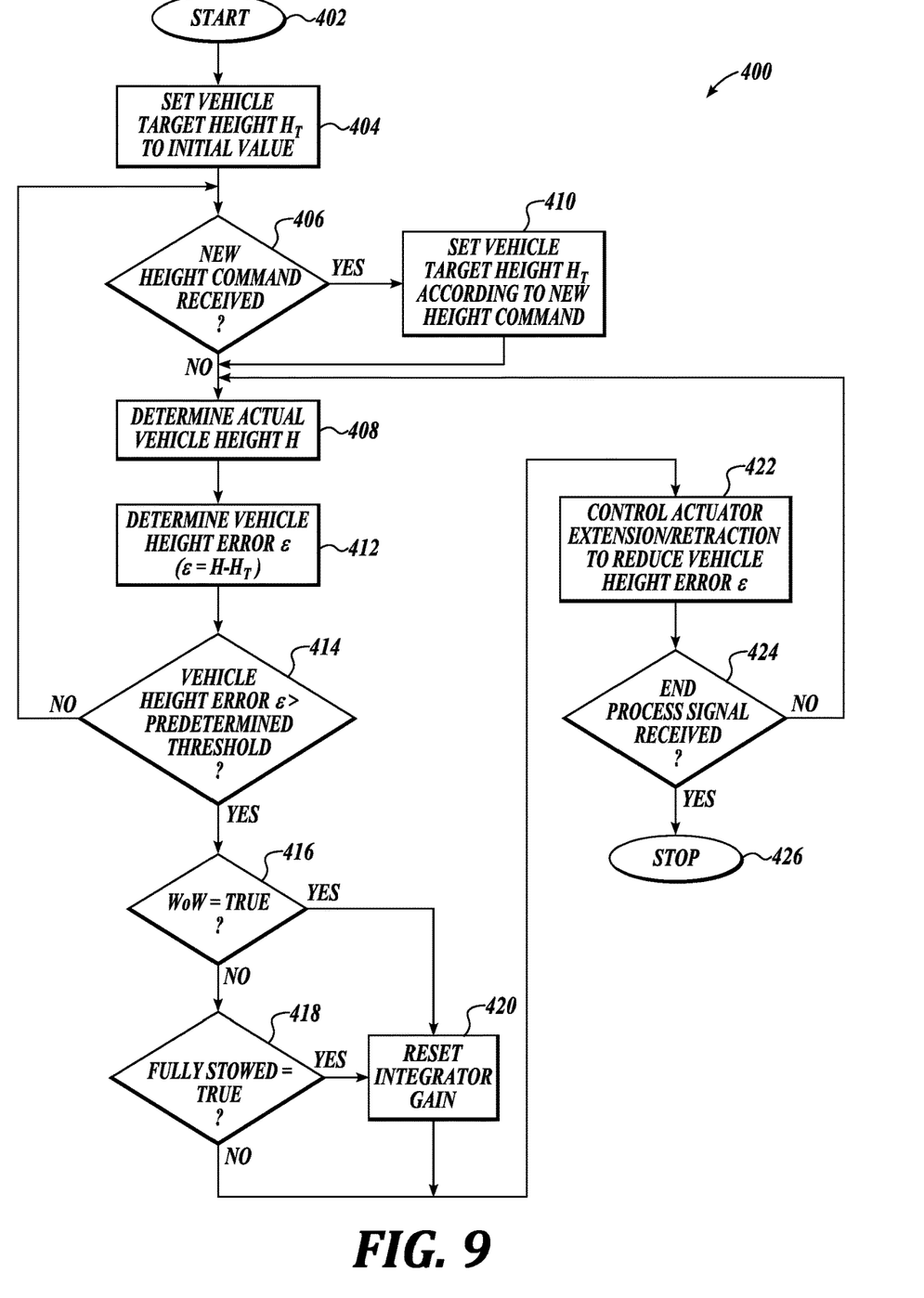
FIG. 9 shows a second representative embodiment of the method shown in FIG. 5.

FIG. 9 shows another representative embodiment of the method 200 shown in FIG. 5, wherein the illustrated method 400 utilizes a PID controller to provide the feedback control of the landing gear position. More specifically, the PID controller is a PID controller with an integral component. As will be described in further detail, the illustrated method 400 resets the integrator gain upon reaching and/or leaving the fully stowed and/or the WoW conditions. Resetting integrator gain in this manner prevents windup in the system when the actuator motion has no effect on vehicle height.

The method 400 starts at block 402 and proceeds to block 404. In block 404, the vehicle target height $H_T$ is set to an initial value. The vehicle target height is the height of the vehicle at a desired operating state. In some embodiments, the vehicle target height is the last previously received vehicle target height. In some embodiments, the vehicle target height is a predetermined or default vehicle target height. The method 400 then proceeds to block 406.

In block 406, the method 400 determines if a new height control request has been received. If a new height control request has not been received, then the vehicle target height $H_T$ remains unchanged, and the method 400 proceeds to block 408. If a new height control has been received, then the method proceeds to block 410. In block 410, the vehicle target height $H_T$ is set to the target height corresponding to the height control request. The method then proceeds to block 408.

In block 408, the actual height H of the vehicle is determined according to one or more sensors 106. In some embodiments, the vehicle height H is measured directly. In some embodiments, the vehicle height is determined indirectly from one or more sensed vehicle conditions. The method 400 then proceeds to block 412.

In block 412, a vehicle height error ε is determined. In some embodiments, the vehicle height error is defined as the difference between the actual vehicle height H and the target height $H_T$ such that:

$$\varepsilon = H - H_T$$

The method 400 proceeds to block 414, wherein the method 400 determines if the vehicle height error HE is greater than a predetermined threshold. If the vehicle height error ε is less than the predetermined threshold, then the method returns to block 406 to determine if a new height control request has been received. If the vehicle height error ε is greater than the predetermined threshold, then the method proceeds to block 416. In some embodiments, the predetermined threshold is 0. That is, the method proceeds to block 416 for any non-zero value of vehicle height error ε. In some embodiments, the predetermined threshold is a non-zero value to reduce the number of minor extensions and retractions (in block 422). The method 400 then proceeds to block 416.

In block 416 the method 400 determines if WoW=TRUE. If WoW=TRUE, then the method proceeds to block 420. If WoW=FALSE, then the method proceeds to block 418. In block 418, the method determines if the landing gear is fully stowed. If the landing gear is fully stowed, i.e., fully stowed=TRUE, then the method 400 proceeds to block 420. If the landing gear is not fully stowed, i.e., fully stowed=FALSE, the method 400 proceeds to block 422.

In block 420, the controller integrator gain is reset in response to WoW being TRUE (block 416) or the landing gear being fully stowed (block 418). The method 400 then proceeds to block 422.

In block 422, the landing gear is extended or retracted according to the vehicle height error ε. More specifically, the landing gear is extended or retracted to reduce the vehicle height error ε. If the vehicle height error ε indicates that the vehicle height H is greater than the vehicle target height $H_T$, then the landing gear is retracted to lower the vehicle height. If the vehicle height error ε indicates that the vehicle height H is less than the vehicle target height $H_T$, then the landing gear is extended to increase the vehicle height.

In block 424, the method 400 checks for an end process signal. In some embodiments, the end process signal is given to put the landing gear into standby mode, such as when the landing gear is stowed, and the vehicle is traveling under cruise conditions. In some embodiments, the standby mode is enabled when the vehicle is docked and/or at least partially supported by a fixed support structure. If an end process signal is detected, the method proceeds to block 426, and the method 400 ends as the landing gear enters standby mode. If an end process signal is not received, the method returns to block 408, and active control of the landing gear continues.

Figure 10:
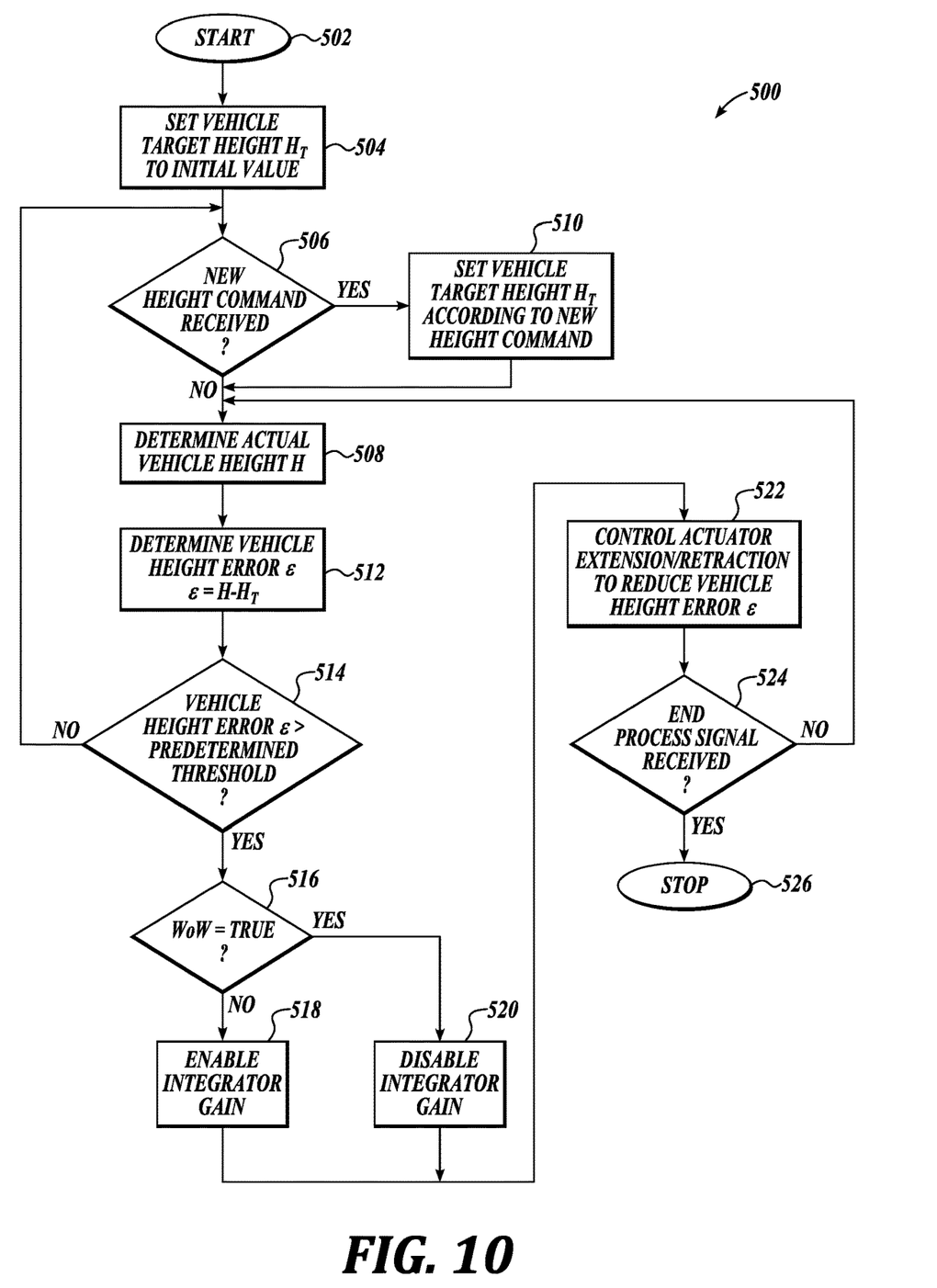
FIG. 10 shows a third representative embodiment of the method shown in FIG. 5.

FIG. 10 shows another representative embodiment of the method 200 shown in FIG. 5, wherein the illustrated method 400 utilizes a PID controller to provide the feedback control of the landing gear position. More specifically, the illustrated embodiment uses sliding gains to disable the integrator gain when the vehicle is not supported by the landing gear, i.e., when WoW is FALSE. Selectively disabling integrator gain in this manner prevents windup in the system when the actuator motion has no effect on vehicle height.

The method 500 starts at block 502 and proceeds to block 504. In block 504, the vehicle target height $H_T$ is set to an initial value. The vehicle target height $H_T$ is the height of the vehicle at a desired operating state. In some embodiments, the vehicle target height $H_T$ is the last previously received vehicle target height. In some embodiments, the vehicle target height $H_T$ is a predetermined or default vehicle target height. The method 500 then proceeds to block 506.

In block, the method 500 determines if a new height control request has been received. If a new height control request has not been received, then the vehicle target height $H_T$ remains unchanged, and the method 500 proceeds to block 508. If a new height control has been received, then the method proceeds to block 510. In block 510, the vehicle target height $H_T$ is set to the target height $H_T$ corresponding to the height control request. The method 500 then proceeds to block 508.

In block 508, the actual height H of the vehicle is determined according to one or more sensors 106. In some embodiments, the vehicle height H is measured directly. In some embodiments, the vehicle height is determined indirectly from one or more sensed vehicle conditions. The method 500 then proceeds to block 512.

In block 512, a vehicle height error ε is determined. In some embodiments, the vehicle height error is defined as the difference between the actual vehicle height H and the target height $H_T$ such that:

$$\varepsilon = H - H_T$$

The method 500 proceeds to block 514, wherein the method 500 determines if the vehicle height error ε is greater than a predetermined threshold. If the vehicle height error ε is less than the predetermined threshold, then the method returns to block 506 to determine if a new height control request has been received. If the vehicle height error ε is greater than the predetermined threshold, then the method proceeds to block 516. In some embodiments, the predetermined threshold is 0. That is, the method 500 proceeds to block 516 for any non-zero value of vehicle height error ε. In some embodiments, the predetermined threshold is a non-zero value to reduce the number of minor extensions and retractions (in block 522). The method 500 then proceeds to block 516.

In block 516 the method 500 determines if WoW=TRUE. If WoW=TRUE, then the method 500 proceeds to block 520. In block 520, the controller gain is disabled. If WoW=FALSE in block 516, then the method 500 proceeds to block 518. In block 518, the controller integrator gain is enabled. From either block 518 or 520, the method 500 proceeds to block 522.

In block 522, the landing gear is extended or retracted according to the vehicle height error ε. More specifically, the landing gear is extended or retracted to reduce the vehicle height error ε. If the vehicle height error ε indicates that the vehicle height H is greater than the vehicle target height $H_T$, then the landing gear is retracted to lower the vehicle height. If the vehicle height error ε indicates that the vehicle height H is less than the vehicle target height $H_T$, then the landing gear is extended to increase the vehicle height.

In block 524, the method 500 checks for an end process signal. In some embodiments, the end process signal is given to put the landing gear into standby mode, such as when the landing gear is stowed, and the vehicle is traveling under cruise conditions. In some embodiments, the standby mode is enabled when the vehicle is docked and/or at least partially supported by a fixed support structure. If an end process signal is detected, the method 500 proceeds to block 526, and the method ends as the landing gear enters standby mode. If an end process signal is not received, the method 500 returns to block 508, and active control of the landing gear continues.

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The invention claimed is:

1. A controller for controlling a landing gear of a maglev vehicle, the controller configured with logic that, in response to execution by the controller, causes the controller to perform actions comprising:
receiving a height control target value; and
transitioning between a standby control state and an active control state, wherein the controller maintains the landing gear in a fixed position when the controller is in the standby control state, and the controller controls extension and retraction of the landing gear according to the height control target value when the controller is in the active control state,
wherein the controller in the active control state performs actions comprising:
receiving a first height control target value corresponding to a landing gear extended position;
sensing a vehicle height;
calculating an error, wherein the error corresponds to a difference between the sensed vehicle height and the received first height control target value; and
at least one of extending and retracting the landing gear to reduce the error.

2. The controller of claim 1, wherein a second height control target value corresponds to a landing gear stowed position.

3. The controller of claim 2, wherein the controller extends and retracts the landing gear to maintain a target vehicle height when the landing gear is in the extended position.

4. The controller of claim 1, wherein the controller in the active control state performs actions comprising:
receiving a second height control target value corresponding to a second landing gear extension state;
calculating the error; and
at least one of extending and contracting the landing gear to reduce the error.

5. The controller of claim 1, wherein the controller in the active control state performs actions further comprising the step of stopping the at least one of extending and contracting the landing gear when the error is less than a predetermined value.

6. The controller of claim 1, wherein a height control target value to stow the landing gear is less than a minimum vehicle levitation height.

7. The controller of claim 6, wherein the minimal vehicle levitation height, corresponds to a minimum vehicle height when Weight on Wheels is FALSE.

8. The controller of claim 1, wherein the controller in the active control state calculates the error and controls extension and retraction of the landing gear.

9. The controller of claim 8, wherein the controller in the active control state uses closed-loop feedback to calculate the error.

10. The controller of claim 8, wherein the controller comprises a proportional-integral-derivative controller.

11. The controller of claim 8, wherein the controller comprises an integrator.

12. The controller of claim 11, wherein the controller in the active control state resets the integrator when the landing gear reaches a fully stowed position.

13. The controller of claim 11, wherein the controller in the active control state resets the integrator when the landing gear moves from a fully stowed position.

14. The controller of claim 11, wherein the controller in the active control state disables the integrator when Weight on Wheels is TRUE.

15. A maglev vehicle, comprising:
a landing gear selectively moveable between an extended position and a retracted position;
a sensor configured to sense a vehicle height; and
a controller in operable communication with the landing gear and the sensor, the controller including one or more circuits programmed to receive a command corresponding to a height control target value and to transition between a standby control state and an active control state, wherein the controller maintains the landing gear in a fixed position when the controller is in the standby control state, and the controller in the active control state controls extension and retraction of the landing gear to reduce a difference between the sensed vehicle height and the height control target value,
wherein the controller in the active control state performs actions comprising:
receiving a first height control target value corresponding to a landing gear extended position;
sensing a vehicle height;
calculating an error, wherein the error corresponds to a difference between the sensed vehicle height and the received first height control target value; and
at least one of extending and retracting the landing gear to reduce the error.

16. The maglev vehicle of claim 15, wherein the controller is a proportional-integral-derivative controller.

17. The maglev vehicle of claim 15, wherein the controller includes one or more circuits programmed to extend and deploy the landing gear using closed-loop control.

18. The maglev vehicle of claim 15, wherein the controller includes one or more circuits configured to receive different height control target values, each height control target value corresponding to an operating condition of the maglev vehicle.

\* \* \* \* \*